United States Patent [19]

Puglisi et al.

[11] Patent Number: 4,950,564
[45] Date of Patent: Aug. 21, 1990

[54] METAL GAS CELL

[75] Inventors: Vincent J. Puglisi; Guy G. Rampel; Kenneth R. Richardson; Orville G. Prickett, all of Gainesville, Fla.

[73] Assignee: Gates Energy Products, Inc., Gainsville, Fla.

[21] Appl. No.: 189,264

[22] Filed: May 2, 1988

[51] Int. Cl.$^5$ .............................................. H01M 2/10
[52] U.S. Cl. .................................... 429/101; 429/186
[58] Field of Search ................ 429/101, 178, 208, 96, 429/186, 179, 27

[56] References Cited

U.S. PATENT DOCUMENTS

| | | | |
|---|---|---|---|
| 4,177,328 | 12/1979 | Rogers | 429/101 X |
| 4,250,235 | 2/1981 | DuPont et al. | 429/211 |
| 4,283,844 | 8/1981 | Milden et al. | 29/623.5 |
| 4,327,158 | 4/1982 | Holleck | 429/101 |
| 4,411,970 | 10/1983 | Meyer et al. | 429/101 X |
| 4,420,545 | 12/1983 | Meyer et al. | 429/101 |
| 4,467,020 | 8/1984 | Puglisi | 429/101 |
| 4,517,264 | 5/1985 | Miller et al. | 429/163 |
| 4,546,054 | 10/1985 | Carr et al. | 429/101 |
| 4,689,544 | 8/1987 | Stadnick et al. | 320/46 |

OTHER PUBLICATIONS

End Plate Support for Nickel-Hydrogen Cell, Derwent Electric Storage Manual Research Disclosure Journal No. 281147, 09/87.

*Primary Examiner*—Anthony Skapars
*Attorney, Agent, or Firm*—C. H. Castleman, Jr.; J. L. Isaac; H. W. Oberg, Jr.

[57] ABSTRACT

A support assembly, including an end plate, for use in metal gas cells. The support assembly inhibits a plate stack which is positioned within a pressure vessel from impinging the walls of the pressure vessel. The support assembly comprises a first and a second weld ring and a first and a second end plate, each of the end plates being attached to a different end of the plate stack. The first and second weld rings mate with the first and second end plates, respectively, and cooperate to support the plate stack. The end plate comprises two plates secured together. A raised portion on one of the plates forming the end plate has a radially extending embossment formed therein to increase the rigidity thereof. The pressure vessel is constructed of generally cylindrical container defining two circumferentially extending lips, each of which is secured to an end portion.

17 Claims, 3 Drawing Sheets

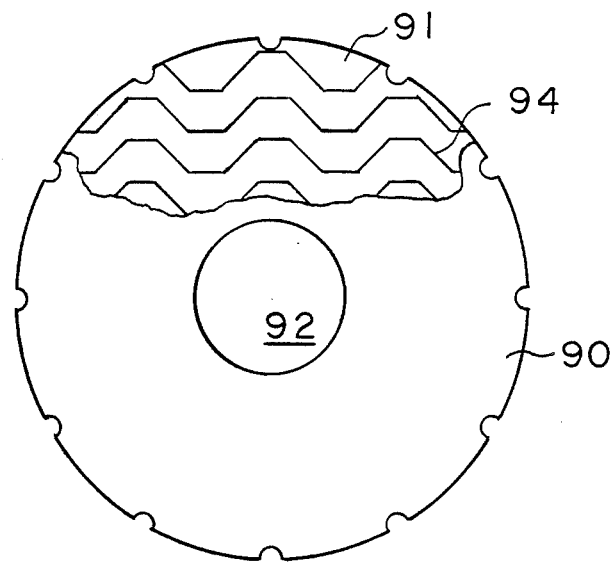
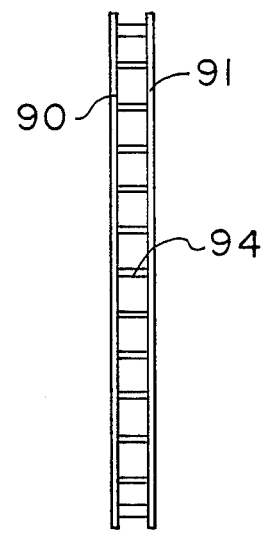
Fig. 3
PRIOR ART
Fig. 4
PRIOR ART
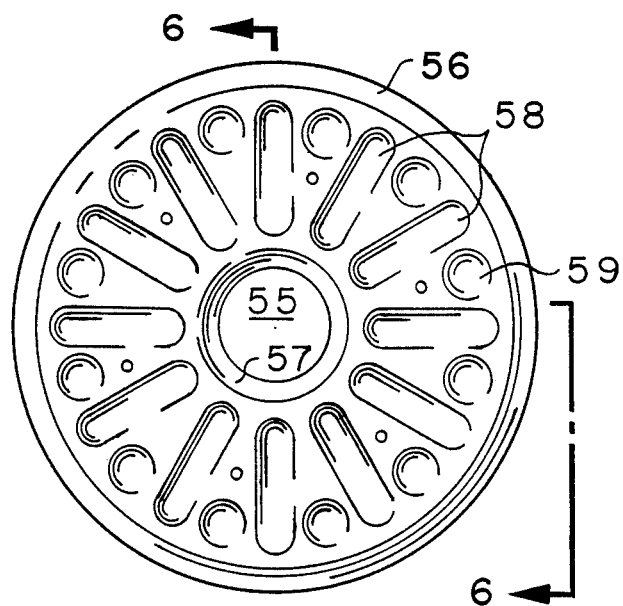
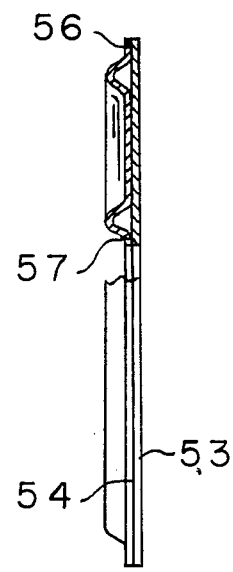
Fig. 5
Fig. 6

METAL GAS CELL

BACKGROUND OF INVENTION

The present invention relates to a metal gas cell, such as a nickel hydrogen battery, and more particularly, to a support assembly for a plate stack which is utilized in a metal gas cell.

Metal gas cells, in particular nickel hydrogen batteries, have evolved to include a plate stack encased within a sealed metal vessel. The vessel has a generally cylindrical configuration and is charged with a gas under pressure, such as hydrogen. Conventionally, a sheet of metal, such as a nickel alloy, is hydroformed into a hollow cylindrically shaped member having one hemispherically configured end portion by stretching the sheet around an appropriately shaped mandrel. Two such members are welded together to form a cylindrically shaped vessel or casing having two hemispherically configured end portions. The constraints of the hydroforming process limit the overall length of the vessel, for example a maximum length of approximately 14 inches can be obtained for a 3.5 inch diameter vessel.

As conventionally manufactured, the length of the pressure vessel, and thus the capacity of an individual cell, has been limited by constraints imposed by the process of hydroforming metal. Typical nickel hydrogen batteries which have a cell stack cantilevered from one end thereof are typically 8-12 inches in length. In addition, the high tooling costs associated with hydroforming further constrains the vessel diameter which must be prescribed at the outset of the hydroforming process. Further, since the thickness of a hollow cylindrical shaped member which is hydroformed for construction of the pressure vessel varies and is smallest at the segment of the member intermediate the hemispherically configured end portion and the lip or edge of the member, the vessel must be designed to withstand a given burst of pressure using the minimum thickness thereby resulting in increased expense and vessel weight.

Components of a simple plate stack include a negative electrode plate, a gas diffusion separator, and a positive electrode plate. Each of these components is a relatively thin, e.g., 0.01–0.05 inch, disc or annular wafer having an opening or aperture through the center thereof. As assembled on an elongated core, the components are juxtaposed and aligned and are repeated in series to form the conventional plate stack of an individual metal gas cell.

Supporting a conventional plate stack within a sealed pressure vessel has previously been accomplished by inserting an elongated, generally cylindrical core having an end plate attached near one end thereof through the aligned apertures of the components of an assembled plate stack. A second end plate is releasably secured on the core in a contiguous relationship with the other end of the assembled plate stack. One end of the core is fixedly secured to the pressure vessel near one end thereof, usually by a weld ring which is utilized to weld the two members together which form the pressure vessel. Thus, the plate stack is cantilevered from one end of the core and the pressure vessel. Since a substantial portion of the pressure exerted by and weight of the plate stack is sustained by the elongated core, the core must be redesigned for each different size of cell in which it is employed so as to withstand the specific pressure and weight imparted to it. Further, since a nickel hydrogen battery functions as an energy source for satellites, the forces transmitted to the cell or battery during prelaunch testing, during launch and flight of the satellite dictate that the plate stack of an individual battery be supported so as to prevent damage from such forces. During satellite testing, launch, and movement in orbit, forces acting on a conventional battery can cause unsupported components of the plate stack, especially those components near the unsupported end of the core, to impinge upon the walls of the pressure vessel thereby damaging and/or shorting the electrodes. Such impingement can result in premature cell or battery failure.

It has been suggested to cantilever mount two separate plate stacks from a weld ring which is positioned approximately in the center of a pressure vessel to increase the energy capacity of a nickel hydrogen battery, as well as the integrity and durability thereof. However, an internal impedance to electrolyte communication between the two separate plate stacks is created by the centrally located weld ring. Additionally, each separate plate stack is cantilevered from a central support and thus may be subject to premature cell failure due to the forces encountered during launch and orbit of a satellite.

End plates used in metal gas cells have been constructed of two annular, correspondingly sized plates having an opening or aperture through the center thereof which are spaced apart and fixedly secured together by means of a plurality of ribbons. The plurality of ribbons are secured to each plate by any suitable means, such as by welding. The plates and ribbons are constructed of a nickel based alloy. However, conventional metal end plates are expensive and require a relatively long manufacturing lead time. And the relatively small rates necessary to produce end plates for the metal gas cell market do not justify the high injection mold costs associated with manufacturing plastic end plates. Thus, a need exists for an inexpensive, thin, e.g. 0.10 in., low volume, and light weight end plate for use in metal gas cells.

Accordingly, it is an object of the present invention to provide a metal gas cell wherein the plate stack which is enclosed within a pressure vessel is effectively supported along substantially the entire length thereof.

Another object of the present invention is to provide a support assembly for a plate stack utilized in a metal gas cell in which an elongated core on which the plate stack is positioned is not a substantial structural component for supporting the weight of pressure imparted by the plate stack.

It is also an object of the present invention is to construct a metal gas cell having a length which is not constrained by the process of manufacturing the pressure vessel component thereof.

It is a further object of the present invention to provide a pressure vessel for use in a metal gas cell which has a substantially uniform thickness, is lightweight, and can be manufactured to any given length.

It is still a further object of the present invention to provide an end plate for use in metal gas cells which is relatively thin, lightweight, and inexpensive and has a relatively low volume and high strength.

SUMMARY OF THE INVENTION

To achieve the foregoing and other objects, and in accordance with the purposes of the present invention, as embodied and broadly described herein, one characterization of the present invention comprises a support assembly used in a metal gas cell for inhibiting a plate stack which is positioned within a vessel containing a fluid at an elevated pressure from impinging the vessel as a result of external forces acting on the cell. The support assembly is fixedly secured to the vessel at distant locations and is connected to both ends of the plate stack. The plate stack defines two ends and comprises a negative electrode plate, a positive electrode plate, and an electrically insulative, porous separator plate positioned between the negative electrode plate and the positive electrode plate.

In another characterization of the present invention, a first and a second support assembly are provided for use in a metal gas cell. The first and second support assembly cooperate to inhibit a plate stack which is positioned within a vessel containing a fluid at an elevated pressure from impinging the vessel. The plate stack has a generally cylindrical configuration defining two ends and comprises a plurality of component plates. The first support assembly is connected to one end of the plate stack and is fixedly secured to the vessel, while the second support assembly is connected to the other end of the plate stack and is fixedly secured to the vessel.

In yet another characterization of the present invention, a support assembly is provided for use in a metal gas cell and comprises a first and a second ring and a first and a second end plate, each of which have an aperture therethrough. A generally cylindrical configured plate stack having an aperture therethrough is positioned within a vessel. The plate stack comprises a plurality of component plates including a negative electrode plate, a positive electrode plate, and an electrically insulative, porous separator plate positioned between the negative electrode plate and the positive electrode plate. An elongated core is positioned within the apertures. The plate stack, the first end plate, and the second end plate are releasably secured to the elongated core. The first end plate mates with the first ring and the second end plate mates with the second ring to inhibit the plate stack from impinging the vessel.

In still another characterization of the present invention, an end plate for use in a metal gas cell is provided which is comprised of a first plate and a second plate. The first and second plates are secured together. The second plate has an inner and an outer circumference and an interposed, circumferentially extending raised portion. The raised portion has a radially extending embossment formed therein.

In yet a further characterization of the present invention a vessel is provided for housing components of a metal gas cell. The vessel comprises a generally cylindrical container defining two circumferentially extending lips, a first end portion secured to one of the lips, and a second end portion secured to the other lip.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3 is a partially cutaway side view of a prior art end plate for use in a metal gas cell;

FIG. 4 is an end view of a prior art end plate for use in a metal gas cell;

FIG. 5 is a side view of the end plate of the support assembly of the present invention; and FIG. 6 is a quarter sectional end view of the end plate of the support assembly of the present invention taken along line 6—6 of FIG. 5.

DESCRIPTION OF THE PREFERRED EMBODIMENTS

Figure 1:
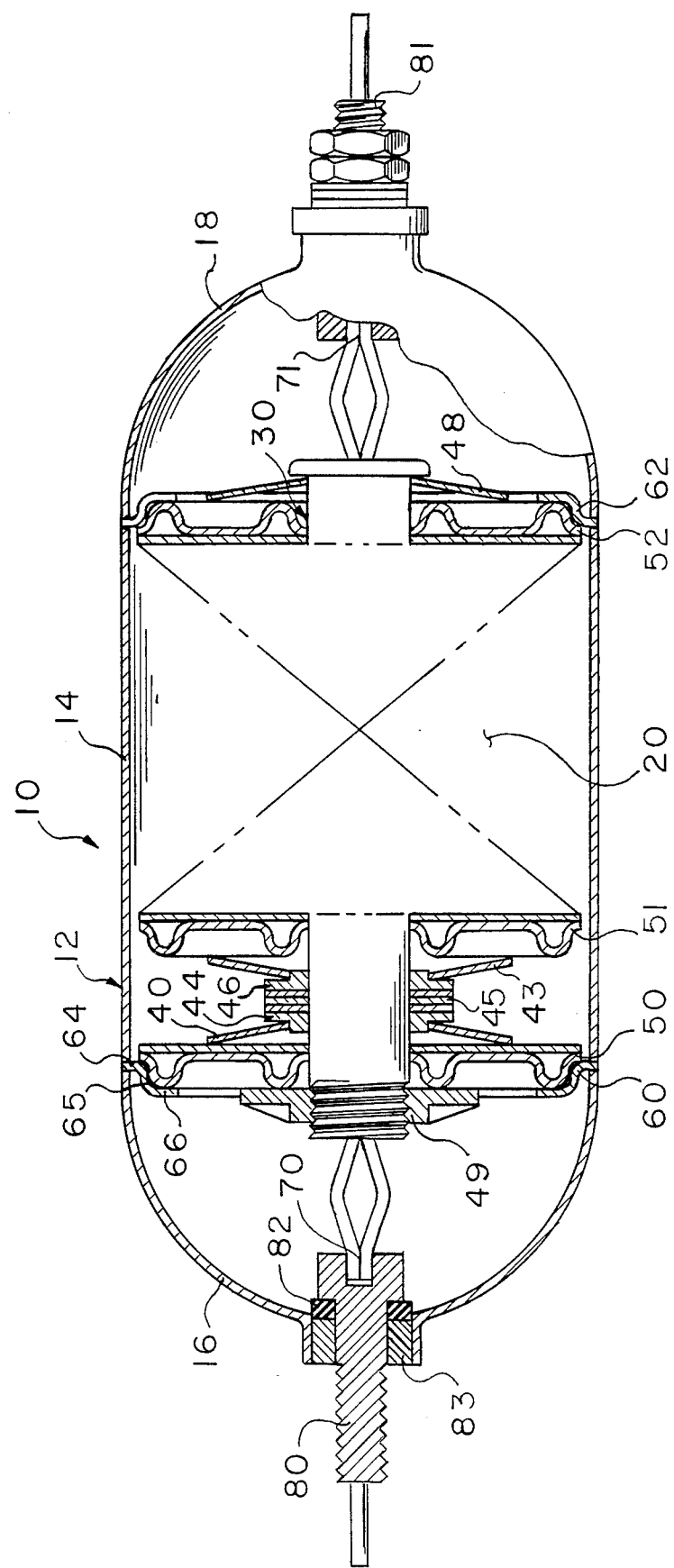
FIG. 1 is a partially cutaway, partially cross-sectional pictorial view depicting the support assembly of the present invention as assembled within a metal gas cell.

Referring now to FIG. 1, the metal gas cell of the present invention is illustrated generally as 10 and is comprised of a thin walled pressure vessel 12 which is capable of containing a fluid under a pressure suitable for operation of the cell for example, gaseous hydrogen at 600–1200 psi. Pressure vessel 12 is comprised of an intermediate container portion 14 which has a generally cylindrical configuration and end portions 16 and 18 secured to each end of container portion 14 as hereinafter described. Container 14 is formed by rolling a sheet of suitable material into a cylindrical configuration and by fixedly securing abutting edges of the material together by any suitable means, such as by welding the edges together along the entire length of container 14. End portions 16 and 18 are hydroformed into a hollow, generally hemispherical configuration and are secured to separate ends of container 14 by any suitable means, for example welding, in a manner hereinafter described. As thus constructed and assembled, vessel 12 can be manufactured to any desired length for a given diameter. Vessel 12 may be constructed of any suitable light weight material, such as, Inconel 718 which is a nickel alloy manufactured by the International Nickel Company.

Figure 2:
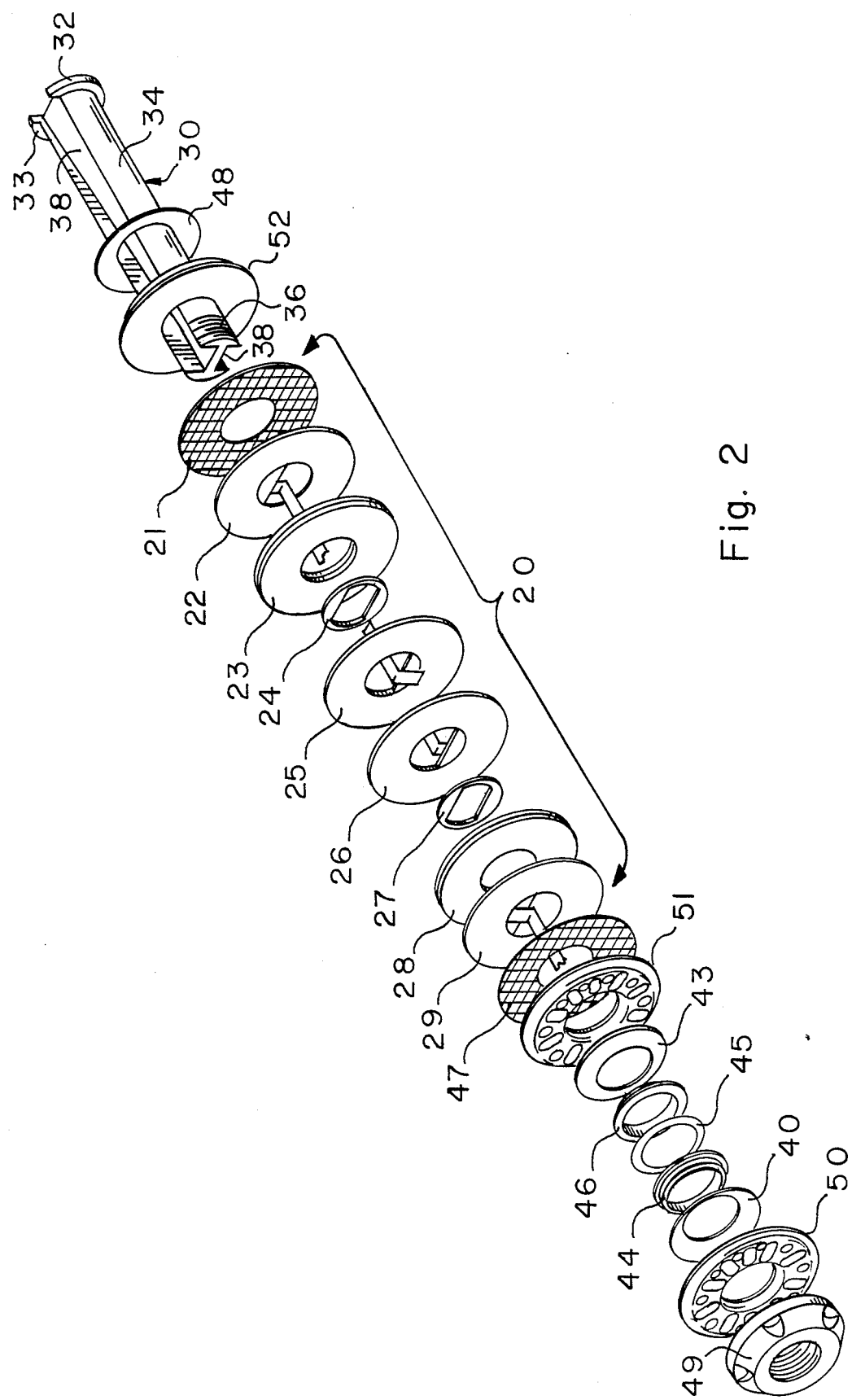
FIG. 2 is an exploded pictorial view of internal components of a metal gas cell including end plates and plate stack components as arranged for assembly onto an elongated core.

A core member illustrated generally as 30 in FIGS. 1 and 2 onto which plate stack 20 is positioned between end plates 50, 51, and 52 and weld rings 60, 62 comprises an elongated core 34. Plate stack 20 has a generally cylindrical configuration defining two ends, has an aperture therethrough, and is comprised of a plurality of component plates including a negative electrode plate, a positive electrode plate, and an electrically insulative, porous separator plate interposed between the positive and negative electrode plates. Core 34 has a generally annular peripheral cross sectional configuration, has a flange 32 integrally formed at one end thereof defining an annular shoulder 33 therebetween, and a male threaded portion 36 formed at the other end of core 34. Core member 30 may also have one or more troughs 38 formed in an outer surface and extending substantially the entire longitudinal length thereof for conducting negative and positive tabs to form leads 70, 71 as illustrated in FIGS. 1 and 2. Leads 70, 71 are connected to terminals 80, 81 respectively as will be evident to the skilled artisan. Each terminal 80, 81 is provided with a teflon compression feed through seal 82 and a sealing collar 83 to seal vessel 12 against fluid leakage.

FIG. 2 illustrates the arrangement for assembling end plates 50, 51 and 52, belleville washers 40, 43 and 48, and the component parts of the plate stack 20 on core member 30. As illustrated, belleville washer 48 is positioned on elongated core 34 such that the inner diameter thereof abuts against shoulder 33. Thereafter end plate 52 is positioned on elongated core 34 such that the substantially flat surface thereof will abut one end of plate stack 20 while the embossed surface thereof abuts the outer diameter of washer 48. Plate stack 20 is then positioned on elongated core 34. As illustrated in FIG. 2, plate stack 20 consists of a gas screen 21, a negative electrode plate 22, two separators 23, an insulating ring 24, positive electrode plates 25 and 26, an insulating ring 27, two separators 28, and negative electrode plate 29. Each of these components of the stack 20 is in the form of a annular wafer or plate having an opening or aperture through the center thereof for placement of each component onto elongated core 34. Separators 23, 28 are formed of any suitable electrically insulative material which has sufficient porosity to permit passage of a liquid electrolyte therethrough, for example a plastic such as polysulfone, polyamides, inorganic oxides, or asbestos. Components 21-29 can be repeated in series a plurality of times depending upon the capacity of the cell being constructed as evident to the skilled artisan. Each of the negative and positive plates are provided with a tab constructed of a current conducting material, for example nickel. Tabs transporting a like charge are stacked upon one another in a contiguous relationship and are positioned within a trough 38 for connection to the positive or negative terminal of the cell as appropriate and as hereinafter described. A gas screen 47 which has a similar configuration to gas screen 21 is positioned on elongated core 34 so as to be continuous with negative plate 29. End plate 51 is then placed onto elongated core 34 such that the substantially flat surface of end plate 51 abuts gas screen 47. Belleville washers 40 and 43 are placed onto elongated core 34 and separated by spacer elements 44, 45 and 46 which compensate for manufacturing tolerances of the individual components of the plate stack. End plate 50 is then positioned on elongated core 34 such that the flat surface of end plate 50 is juxtaposed to belleville washer 43. Finally, the components which have been inserted onto core 34 are pressed together by application of suitable force on end plate 50 and nut 49 which has a female threaded bore therethrough is fully mated with male threaded portion 36 of core member 30. A common failure mechanism of metal gas cells, such as a nickel hydrogen cell, is represented by repeated charge and discharge cycles of the cell which cause the positive electrodes within the plate stack to axially swell. In the support assembly of the present invention, such swelling compresses belleville washers 40, 43, and to a lesser extend separators 23 and 28.

End plates 50, 51, and 52, weld rings 60, 62, and belleville washers 40, 43, and 48 may be constructed of any suitable light weight material, such as, Inconel 718. Core member 30 and spacer elements 44, 45, and 46 may be constructed of any suitable electrically insulative material which has a relatively high strength and utility at relatively high temperatures, for example a plastic such as polysulfone.

Referring now to FIGS. 1 and 2, the metal gas cell 10, particularly a nickel-hydrogen battery, is assembled by initially positioning a weld ring 62 between end portion 18 and container 14 and axially aligning the same prior to welding weld ring 62 to end portion 18 and container 14 from the exterior of vessel 12. A terminal 81 is fixedly secured, such as by welding to lead 71 formed of the plate tabs emanating via a trough 38 from the flange 32 at one end of elongated core 34, while a separate terminal 81 is fixedly secured to lead 70 formed of the tabs emanating via a trough 38 from threaded portion 36 at the other end of elongated core 34. The terminal 81 attached to lead- 71 is inserted through the aperture formed at the end of end portion 18 and core 34 is inserted through the aperture in weld ring 62 until end plate 52 abuts and is mated with weld ring 62. Intermediate container portion 14 is sized such that when the metal gas cell of the present invention is partially assembled in this manner, weld ring 60 abuts the edge of container 14 or is spaced therefrom only by a distance through which weld ring 60 can be forced into contact with the edge of container 14. The unsecured terminal 80 is positioned within the opening in the end of end portion 16 and end portion 16 is positioned to abut weld ring 60. Thereafter, end portion 16 and weld ring 60 are axially aligned and are forced into contact, if necessary, with container 14. Upon contact of end portions 16 and weld ring 60 with vessel 14, weld ring 60 is welded from the exterior of vessel 12 to both vessel 14 and end portion 16. In this assembled position, weld ring 60 abuts end plate 50 resulting in nut 49 being spaced apart from weld ring 60 by an extremely small distance, for example 0.001 inch. Belleville washer 40 partly serves to maintain end plate 50 in contact with weld ring 60. Terminals 80 and 81 are secured to end portions 16 and 18, respectively, by any suitable means, such as by compression. As thus fully assembled, weld rings 60 and 62 in combination with belleville washers 40 and 43 are subjected to substantially all of the pressure and weight imparted by the compressed plate stack. In contrast, elongated core 34 is substantially free from any of the load imparted by the compressed plate stack and is restrained from axial movement within the vessel by the relatively small pressure, e.g. 10-30 lbs., exerted on it by belleville washer 48. Depending on cell size, the drag of the plate stack components may be sufficient to prevent axial movement of core 34 thus eliminating the need for belleville washer 48. This absence of load permits a single structural design of elongated core 34 to be utilized within any metal gas cell incorporating the support assembly of the present invention subject only to varying the length as dictated by cell capacity.

As illustrated in FIGS. 3 and 4, prior art end plates for use in supporting the plate stack of conventional metal gas cells are comprised of two axially aligned annular plates having a central aperture 92 therethrough and fixedly secured together by means of a plurality of strips or ribbons 94 which are aligned in a parallel relationship between the plates 90, 91 so as not to protrude beyond the periphery of either plate and are secured to each plate by means of welds as previously mentioned. As previously mentioned, prior art metal end plates are expensive to manufacture and have exceptionally long procurement lead times.

The end plate utilized in the metal gas cell of the present invention is illustrated in FIGS. 5 and 6 and comprises a first substantially flat plate 53 having an axially aligned substantially annular aperture 55 therethrough. A second plate 54 has a outer annular rim portion 56 and inner annular rim portion 57. Plate 54 is also provided with an axially aligned, substantially annular aperture 55 which is correspondingly sized and aligned with aperture 55 through plate 53. Plate 54 is also sized to have an outer peripheral configuration which substantially corresponds with the outer peripheral configuration of plate 53 when apertures 55 are aligned as illustrated in FIG. 5. Plate 54 is provided with a raised intermediate portion between outer rim 56 and inner rim 57 which has a series of radially extending grooves 58 embossed therein by any suitable means, for example, by hydroforming. Plates 53 and 54 are secured together by any suitable means, for example, by a plurality of spot welds uniformly spaced along the rim 56, rim 57 and grooves 58. Spot welds may be accomplished by any suitable means of welding, for example, by laser welding or electron beam welding. A series of dimples 59 may be provided between each radially extending finger 58 to increase the structural integrity and rigidity of the end plate of the present invention as assembled. The exact number of radially extending grooves 58 which are formed in plate 54 is preferably from 12 to 16. When dimples 59 are formed between radially extending grooves 58 spot welds may be made at the approximate center of the dimple to further secure plate 53 to plate 54. A plurality of holes may be provided in the raised portion of plate 54 to allow for drainage of any electrolyte which may become trapped between plates 53 and 54. While grooves 58 and dimples 59 have been illustrated in FIGS. 5 and 6, any design can be embossed in the raised portion of plate 54 which provides a uniformed stiffness across plate 54 due to the radial nature of the design embossed. The embossed design inherently reduces the volume of the end plate of the present invention.

Weld rings 60 and 62 have a circumferentially extending outer rim 64 and a circumferentially extending inner rim 66 which are axially offset and connected by means of rib 65. End plates 50, 52 and weld rings 60, 62 are sized so that when assembled on core 34 and secured by nut 49, outer rim portion 64 abuts outer rim 56 and the circumferential outer edge of the raised immediate portion of each weld ring is contiguous with rib 65. As fully assembled with a metal gas cell, end plates 50, 52 are mated with and nestled within weld rings 60, 62 respectively.

Thus, the present invention provides a support assembly including end plates 50, 51 and 52 and weld rings 60 and 62 which, as assembled, function in cooperation with elongated core 34 and vessel 12 to support a plate stack of a metal gas cell while substantially reducing the load imparted to the elongated core around which the plate stack is contiguously positioned. The support assembly of the present invention is secured to each end of the plate stack and cooperates with vessel 12 so as to effectively support the plate stack along substantially the entire length thereof. Accordingly, the premature cell failure due to shorting of the electrodes is reduced since the plate stack is inhibited by the support assembly of the present invention from impinging vessel 12 upon the cell encountering external forces, such as the forces encountered during launch and orbit of a satellite. Although the support assembly of the present invention has been described as having particular utility in a nickel-hydrogen battery, the support assembly can be utilized to support a plate stack within any metal gas cell, including silver-hydrogen and lead-hydrogen batteries.

The following example describes the manner and process of making and using the present invention and sets forth the best mode contemplated by the inventors of carrying out the invention but is not to be construed as limiting the scope thereof.

EXAMPLE

A nickel hydrogen battery was constructed to have an overall length of 9.763 inches and a capacity of 88 ampere hours. A 4.307 inch long and 0.024 inch thick cylindrical container was formed by rolling a sheet of Inconel 718, a nickel alloy manufactured by the International Nickel Company, into a cylindrical configuration and welding the abutting edges of the sheet together by tungsten inert gas (TIG) welding. A first hollow hemispherically configured end portion hydroformed from a sheet of Inconel 718 and having a length of 2.709 inches and a nominal thickness of 0.027 inches was assembled to one edge of the container by interposing, axially aligning, and externally and circumferentially welding a weld ring by means of a TIG welder. The weld ring was constructed of Inconel 718 and had an inner diameter of 2.868 inches, an outer diameter of 3.550 inches, and a thickness of 0.019 inches. An elongated core constructed of polysulfone and having a length of 4.737 inches had a plate stack, belleville washers, end plates, and spacer elements positioned thereon in the manner described herein and releasably secured thereto by means of a nut constructed of polysulfone and mated with the male threaded portion of one end of the core. Each end plate was constructed of Inconel 718 and had an inner diameter of 0.789 inches and a thickness of 0.101 inches. The end plates corresponding to 51 and 52 in FIG. 1 had an outer diameter of 3.375 inches while the end plate corresponding to 50 in FIG. 1 had an outer diameter of 3.295 inches. Each end plate had the radial design illustrated in FIG. 5 embossed in one face thereof by hydroforming. Each belleville washer was constructed of Inconel 718 and had a thickness of 0.040 inches, an inner diameter of 1.25 inches, an outer diameter of 2.375 inches, and a full compression force of 150 lbs. Three polysulfone spacer elements were employed between the belleville washers corresponding to 40 and 43 in FIG. 1. Each spacer element had an inner diameter of 0.793 inches, an outer diameter of 1.375 inches, and a thickness of 0.030 inches. Upon assembly, the elongated core, plate stack, and support assembly were positioned within the welded cylinder and end portion. A second hollow hemispherically configured end portion which was identical to the first end portion in construction and dimension was assembled to the other edge of the container by interposing, axially aligning, and circumferentially welding a second weld ring by means of an TIG welder. The second weld ring was constructed of Inconel 718 and had a inner diameter of 2.982 inches, an outer diameter of 3.550 inches, and a thickness of 0.019 inches. As thus constructed, the nickel hydrogen battery was designed to withstand the high levels of vibration and shock which are believed to be encountered in satellite launch and flight, for example, a random vibration profile of 12.1 G rms and a pyrotechnic shock response spectrum.

As illustrated in FIG. 1, plate stack 20 as fully assembled and supported within metal gas cell 10 in accordance with the present invention is not axially centered within the cell. In order to maintain thermal symmetry between a plurality of cells so that any heat transfer device is independent of the relative orientation of the cells, a centering ring (not illustrated) can be interposed between weld ring 62 and end plate 52. The centering ring possesses a thickness which serves to axially center plate stack 20 within cell 10.

While the preferred embodiments have been fully described and depicted for the purpose of explaining the principles of the present invention, rt will be appreciated by those skilled in the art that modification substantiations and changes may be made thereto without departing from the scope of the invention set forth in the appended claims.

We claim:

1. A metal gas cell comprising:
   container means for containing a fluid at an elevated pressure;
   a plate stack positioned within said container means, said plate stack defining two ends and comprising a negative electrode plate, a positive electrode plate, and an electrically insulative, porous separator plate positioned between said negative electrode plate and said positive electrode plate: and
   securing means for inhibiting said plate stack from impinging said container means as a result of external forces acting on said cell, said securing means being fixedly secured to said container means at distant locations and being connected to both ends of said plate stack.

2. The metal gas cell of claim 1 wherein a portion of said container means is a substantially cylindrical vessel and said securing means is fixedly secured to said vessel at said distant locations and about substantially the entire circumference of said vessel.

3. A metal gas cell comprising:
   a vessel having a generally cylindrical intermediate portion, said vessel capable of containing a fluid at an elevated pressure;
   a generally cylindrically configured plate stack positioned within said intermediate portion, said plate stack defining two ends and comprising a plurality of component plates;
   first means for supporting said plate stack, said first means being secured to one of said ends and being fixedly secured to said vessel; and
   second means for supporting said plate stack, said second means being secured to the other of said ends and being fixedly secured to said vessel, said first means and said second means cooperating to inhibit said plate stack from impinging said vessel.

4. A metal gas cell comprising:
   container means for containing a fluid at an elevated pressure;
   a plate stack positioned within said container means, said plate stack defining two ends and comprising a negative electrode plate, a positive electrode plate, and an electrically insulative, porous separator plate positioned between said negative electrode plate and said positive electrode plate;
   support means for supporting substantially all of the weight and pressure of said plate stack and for inhibiting said plate stack from impinging said container means; and
   an elongated core member positioned within apertures formed through said plate stack, said elongated core being substantially free from load imparted by said plate stack.

5. The metal gas cell of claim 4 wherein said support means is fixedly secured to said container means.

6. The metal gas cell of claim 5 wherein said container means is a substantially cylindrical vessel and said support means is fixedly secured to said vessel at two locations.

7. A metal gas cell comprising:
   a vessel having a substantially cylindrical intermediate portion, a first end portion, and a second end portion;
   a first ring interposed between and secured to said intermediate portion and said first end portion, said first ring extending into said vessel;
   a second ring interposed between and secured to said intermediate portion and said second end portion, said second ring extending into said vessel;
   a generally cylindrical configured plate stack positioned within said vessel and having an aperture therethrough, said plate stack defining two ends and comprising a plurality of component plates including a negative electrode plate, a positive electrode plate, and an electrically insulative, porous separator plate positioned between said negative electrode plate and said positive electrode plate;
   a first end plate connected to one end of said plate stack and having an aperture therethrough;
   a second end plate connected to the other end of said plate stack and having an aperture therethrough; and
   an elongated core positioned within said apertures, said plate stack, said first end plate, and said second end plate being releasably secured to said elongated core, said first end plate mating with said first ring and said second end plate mating with said second ring so as to inhibit said plate stack from impinging said vessel and to substantially reduce any load imparted to said elongated core.

8. The metal gas cell of claim 7 wherein said first end plate is contiguous with said first end of said plate stack and said second end plate is connected to a third end plate by a plurality of washers, said third end plate having an aperture therethrough, being contiguous with said second end of said plate stack, and being releasably secured to said elongated core.

9. The metal gas cell of claim 7 wherein each of said first ring and said second ring comprises a circumferentially extending outer rim, a circumferentially extending inner rim, and a circumferentially extending rib connecting said outer rim and said inner rim in an axially offset relation.

10. The metal gas cell of claim 9 wherein said inner rim, said rib and a portion of said outer rim extend into said vessel.

11. The metal gas cell of claim 10 wherein each of said first end plate and said second end plate comprises:
    a first plate;
    a second plate defining an inner circumference and an outer circumference, said second plate having a circumferentially extending raised portion between said inner circumference and said outer circumference, said raised portion having a radially extending embossment formed wherein; and
    means for securing said first plate to said second plate.

12. The metal gas cell of claim 11 wherein said outer circumference abuts said portion of said outer rim extending into said vessel.

13. The metal gas cell of claim 8 wherein each of said first ring and said second ring comprises a circumferentially extending outer rim, a circumferentially extending inner rim, and a circumferentially extending rib connecting said outer rim and said inner rim in an axially offset relation.

14. The metal gas cell of claim 13 wherein said inner rim, said rib and a portion of said outer rim extend into said vessel.

15. The metal gas cell of claim 14 wherein each of said first end plate and said second end plate comprises:
a first plate;
a second plate defining an inner circumference and an outer circumference, said second plate having a circumferentially extending raised portion between said inner circumference and said outer circumference, said raised portion having a radially extending embossment formed therein; and
means for securing said first plate to said second plate.

16. The metal gas cell of claim 15 wherein said outer circumference abuts said portion of said outer rim extending into said vessel.

17. The metal gas cell of claim 7 wherein said elongated core has a flange formed at one end thereof defining a substantially annular shoulder, said metal gas cell further comprising a belleville washer interposed and abutting said first end plate and said substantially annular shoulder.

* * * * *